United States Patent [19]
Sato

[11] Patent Number: 5,889,557
[45] Date of Patent: Mar. 30, 1999

[54] AUTOMATIC BEAM CURRENT LIMIT APPARATUS AND METHODS OF THE SAME

[75] Inventor: Hiroaki Sato, Kawanishi, Japan

[73] Assignee: Matsushita Electric Industrial Co., Ltd.

[21] Appl. No.: 862,159

[22] Filed: May 22, 1997

[30] Foreign Application Priority Data

May 22, 1996 [JP] Japan ................................ 8-126758

[51] Int. Cl.⁶ .......................................... H04N 5/68
[52] U.S. Cl. ........................................... 348/380; 348/173
[58] Field of Search .................................. 348/173, 174, 348/189, 377, 378, 380, 687, 688, 673, 810; 315/383

[56] References Cited

U.S. PATENT DOCUMENTS

| | | | |
|---|---|---|---|
| 3,735,029 | 5/1973 | Sunstein | 348/380 |
| 4,096,518 | 6/1978 | Tuma | 348/380 |
| 4,253,127 | 2/1981 | Avery | 348/380 |
| 4,562,479 | 12/1985 | McDonald | 348/380 |
| 5,200,829 | 4/1993 | Lagoni | 348/380 |
| 5,313,294 | 5/1994 | Haferl | 348/377 |
| 5,589,883 | 12/1996 | Ogino | 348/379 |

FOREIGN PATENT DOCUMENTS

| | | |
|---|---|---|
| 1-298881 | 12/1989 | Japan . |
| 5-191742 | 7/1993 | Japan . |
| 5-276461 | 10/1993 | Japan . |

*Primary Examiner*—Victor R. Kostak
*Attorney, Agent, or Firm*—Ratner & Prestia

[57] ABSTRACT

An automatic beam current limiting apparatus for limiting beam currents of R, G, and B colors separately without affecting the the CRT drive. In particular, the Average Picture Level (APL) of each of the R, G, and B color video signals at the preceding stage of a video power amplifier is detected and compared with a reference voltage. When the APL of the video signal is higher than the reference voltage, the amplitude of the video signal is controlled to limit the beam current driving the CRT. In addition, the G1 voltage, and G2 voltage may be compared with a reference voltage and a result calculated by the APL calculating circuit. When the result is higher than the reference voltage, the amplitude of the video signal is controlled to limit the beam current driving the CRT.

9 Claims, 8 Drawing Sheets

AUTOMATIC BEAM CURRENT LIMIT APPARATUS AND METHODS OF THE SAME

FIELD OF THE INVENTION

The present invention relates to an apparatus and a method of limiting beam currents to prevent X-ray radiation from a CRT display and to protect the CRT display.

BACKGROUND OF THE INVENTION

Generally, CRT displays include an automatic beam limiter (referred to as ABL hereinafter) for limiting CRT beam currents to less than a predetermined rate in order to prevent the radiation of X-ray and protect the CRT circuits.

Common ABL circuits are designed for detecting the beam current in a high-voltage generating circuit or a CRT cathode circuit and if the beam current exceeds a predetermined threshold, limiting the amplitude of a video signal.

Such a detecting process is implemented by a beam current detecting circuit mounted in a CRT driving circuit which drives video signals of R, G, and B colors before delivering to their respective CRT cathodes for display of an image, and adapted for detecting the beam current for each cathode and when the beam current exceeds a predetermined threshold, limiting the amplitude of its video signal. The arrangement and action of an automatic beam current limiting circuit in a color television receiver disclosed in Japanese Patent Laid-open Publication H5-276461 are now explained referring to FIG. 7.

As shown in FIG. 7, the beam current detecting circuit denoted at 50 which detects the beam currents of R, G, and B colors is interposed between the cathode of a CRT 53 and a video power amplifier 52 for driving the cathodes with their respective R, G, and B video signals. A contrast control circuit 51 is connected between an input video signal 10 and the video power amplifier 52. The input video signal 10 is fed from the contrast control circuit 51 to the video power amplifier 52 where it is amplified and then transmitted via the beam current detecting circuit 50 to the CRT 53. The contrast control circuit 51 has a control terminal 58 thereof for receiving a control voltage to control the contrast. When the control voltage at the control terminal 58 is decreased, contrast control circuit 51 lowers its video signal output thus causing the CRT drive video signals or beam currents to be reduced.

The beam current detecting circuit 50 delivers the video signals to the CRT 53 and also detects the beam currents of their respective colors. The beam currents are then filtered and resultant DC voltages are fed to an ABL control circuit 55.

When any of the DC voltages derived from their respective R, G, and B beam currents is greater than a reference voltage Vref in the ABL control circuit 55, one of three transistors Tr1(B), Tr2(G), and Tr3(R) in the ABL control circuit 55 is turned on so as to flow current through a resistor R1 and a resistor R2. As a result, the voltage at the control input terminal 58 of the contrast control circuit 51 is reduced causing the R, G, and B video signals to be reduced in amplitude so that the beam currents are controlled.

Another example of the conventional circuitry method of limiting the peak value of beam currents for prevention of blooming in an image with the help of an ABL circuit is also known as disclosed in Japanese Patent Laid-open Publication H5-191742 which is illustrated in FIG. 8A.

The arrangement and action of the peak brightness (or peak current) limiting circuit shown in FIG. 8A is explained in detail. A peak brightness limiting circuit 62 is provided upstream of a CRT 70 and a brightness signal processing circuit 67 which includes a video power amplifier for driving the CRT 70.

A video signal 10 is supplied via the peak brightness limiting circuit 62 to the brightness signal processing circuit 67 where it is amplified by the video power amplifier for driving the CRT 70.

An ABL control voltage generating circuit 72 is provided for detecting a beam current from the anode of the CRT 70 and delivering a corresponding ABL control voltage 74.

When the beam current from the CRT is great, representing a high level of brightness on the CRT 70, the ABL control voltage 74 of the ABL control voltage generating circuit 72 becomes lower. The ABL control voltage 74 is added with an output voltage of a contrast control voltage generating circuit 71 and fed to the brightness signal processing circuit 67 for attenuating the beam current. If the beam current of the CRT 70 is small, representing a low brightness level on the CRT, the sum of the voltage signals increases the beam current. The right half of FIG. 8A is the ABL circuit which comprises the CRT 70, the contrast control voltage generating circuit 71, the ABL control voltage generating circuit 72, a high-voltage generating circuit 73, and the brightness signal processing circuit 67 for detecting beam current from the anode of the CRT 70 and controlling the beam current.

The video signal 10 is supplied to an average picture level (referred to as APL hereinafter) detecting circuit 63 as well as the peak brightness limiting circuit 62. The APL detecting circuit 63 picks up and transmits an APL voltage to a comparator circuit 64. The ABL control voltage 74 is also fed to the comparator circuit 64.

The comparator circuit 64 examines the APL voltage and the ABL control voltage 74 and, when detecting an intermediate level between a high APL enabling ABL and a low APL disabling ABL (which may produce a dim image having regions of peak brightness), controls the peak brightness limiting circuit 62 to attenuate the gain of a high amplitude range of the video signal as shown in FIG. 8B. As the gain of the high amplitude range of the video signal has been attenuated, the beam current peak is controlled minimizing a blooming effect in an image.

It is known as a technological dilemma of CRT displays that problems may arise when the screen size or the horizontal scanning frequency is increased. For maintaining the brightness at an equal level on a larger size of the screen with the anode voltage remaining uniform, the beam current has to be increased corresponding to the ratio of enlargement of the screen. For increasing the horizontal scanning frequency, the frequency range of the video signal has to be proportionally increased thus demanding the use of a wider frequency range of the video signal processing circuit for driving the CRT. Accordingly, it is essential for increasing the screen size or the horizontal scanning frequency to employ the CRT driving signal of a high amplitude and a wide frequency range.

The conventional ABL circuit, where a detecting circuit is interposed between the video power amplifier and the CRT or connected ahead of the CRT, may be effective if the beam currents of three colors for the CRT are controlled separately. However, while the foregoing demand is involved, installation of the detecting signal in the video signal power circuit for handling the video signal of a high amplitude may increase a floating capacitance of the video signal power circuit thus reducing the frequency range characteristic of the CRT driving circuit.

Also, the output section of the video power amplifier for high amplitude and wide frequency range should employ as the power transistor a higher slew rate transistor which is unfavorable in the cost. It is known that the higher slew rate transistor in the video amplifier circuit enhances the frequency range characteristics when the amplitude of the video signal is small, allowing amplification of a wider frequency range and handling a higher amplitude of the video signal. It is understood, however, that such transistors, as capable of amplifying the wide frequency range of a high power signal passed between the video power amplifier and the CRT, are very expensive and may be commercially available with difficulty.

Furthermore, the conventional method in which the APL of video signals is detected and used for limiting the amplitude peak of the video signal to determine the peak value of beam currents at the preceding step of the video power amplifier for driving the cathode of a CRT is effective in the beam current limiting action for the CRT. It is true, however, that the linearity of screen brightness may be reduced and the detection of the R, G, and B beam currents is hardly conducted on the basis of each color due to the use of a CRT anode for the beam current detection.

SUMMARY OF THE INVENTION

For solving the foregoing drawbacks, an automatic beam current limiting apparatus according to the present invention comprises signal distributing means provided at the preceding stage of a video power amplifier for the CRT display for distributing video signals of R, G, and B colors.

The video signals are distributed from the distributing means to the video power amplifier and also to detecting means for detecting the average video amplitude level of a group of the video signals of each color. There are provided comparing means for comparing the average video amplitude level of each color video signal with a reference voltage.

When the average video amplitude level of any color video signal is higher than the reference voltage, the color video signal of R, G, and B colors is limited in the amplitude.

DESCRIPTION OF THE PREFERRED EMBODIMENTS

First Exemplary Embodiment

Figure 1:
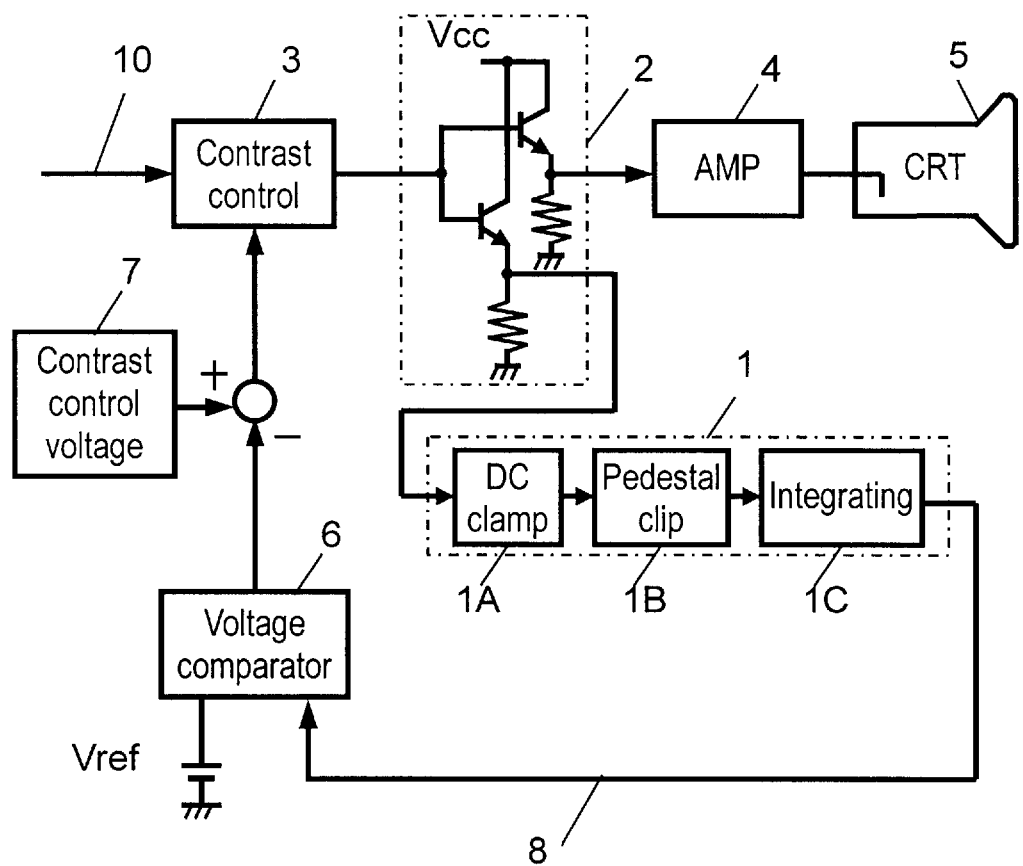
FIG. 1 is a block diagram of an automatic beam current limiting apparatus showing a first embodiment of the present invention.

FIG. 1 illustrates a first embodiment of an automatic beam current limiting apparatus according to the present invention. An arrangement in the block diagram of FIG. 1 is explained. A video input signal 10 is supplied to a contrast control circuit 3 of which an output signal is delivered to a distributing circuit 2. An output signal from the distributing circuit 2 is distributed to a video power amplifier 4 and an APL detecting circuit 1. An output signal of the video power amplifier 4 is transmitted to a CRT 5 for driving CRT 5. An output signal of the APL detecting circuit 1 is fed to a voltage comparator circuit 6 where it is compared with a reference voltage Vref. A resultant output signal of the voltage comparator circuit 6 is also compared with a contrast control voltage 7 before transmission to the contrast control circuit 3.

In practice, three of the circuitry arrangements of FIG. 1 including the APL detecting circuit 1, the signal distributing circuit 2, the contrast control circuit 3, the video power amplifier 4, and the voltage comparator circuit 6 are needed for R, G, and B signals respectively. More particularly, the APL detecting circuits 1r, 1g, 1b (the suffixes r, g, and b representing the R, G, and B signals), the distributing circuits 2r, 2g, 2b, the contrast control circuits 3r, 3g, 3b, the video power amplifiers 4r, 4g, 4b, the CRT 5, and the voltage comparator circuits 6r, 6g, 6b. The three, R, G, and B, signal systems are identical in both structure and action and one of them will be explained as shown in FIG. 1 for simplicity while disregarding the suffixes r, g, and b.

It would also be understood that the video input signal 10 is a color video signal in this embodiment and if the video signal is a monochrome video signal, it is processed with the single circuitry arrangement.

The following description will hence be made relating to the signal circuitry arrangement unless otherwise specified.

The video power amplifier 4 is a drive unit for the CRT 5.

Each of the R, C, and B video signals is distributed from the distributing circuit 2 connected upstream of the video power amplifier 4 to the video power amplifier 4 for amplification and the APL detecting circuit 1 for APL detection.

The APL detecting circuit 1 comprises a DC clamp circuit 1A, a pedestal clip circuit 1B, and an integrating circuit 1C.

The output signal of the distributing circuit 2 is subjected to DC clamping of the DC clamp circuit 1A, fed to the pedestal clip circuit 1B where its under-pedestal-level portion is clipped, and integrated by the integrating circuit IC to produce an APL voltage 8 of the R, G, or B signal.

The APL voltage 8 of the R, G, or B signal is then compared with the reference voltage Vref in the voltage comparator circuit 6. When any of the three APL voltages 8 is higher than the threshold, the output of the voltage comparator circuit 6 reduces the gain of the contrast control circuit 3. The video output of the contrast control circuit 3 is passed again to the APL detecting circuit 1 and subjected to the same processes. Finally, the APL voltage will be suppressed to Vref. According to the embodiment, the amplitude of the video signal can be controlled thus allowing the beam current to be settled to a predetermined value.

Figure 4:
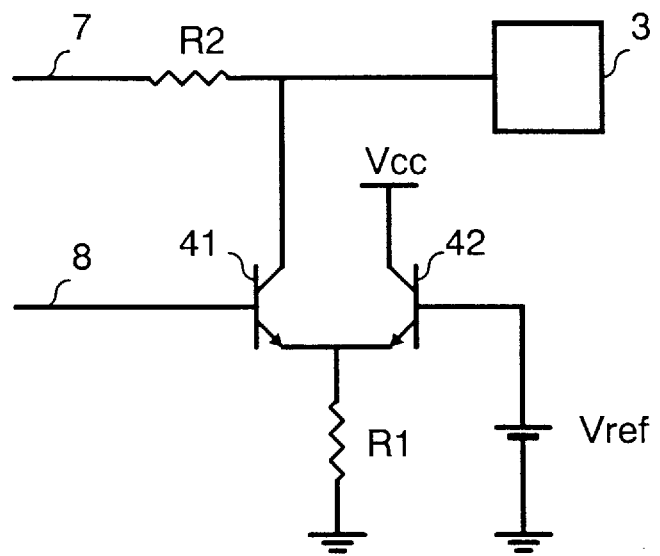
FIG. 4 is a circuitry diagram explaining a voltage comparator circuit of the first embodiment and an example ofcontrolling the contrast control voltage.

The action of the voltage comparator circuit 6 with the contrast control voltage 7 may be implemented by such a circuit as shown in FIG. 4. FIG. 4 illustrates a pair of transistors 41 and 42 forming a differential amplifier. The APL voltage 8 is applied to the base of the transistor 41 while the threshold Vref is applied to the base of the other transistor 42. When the APL voltage 8 is higher than the threshold Vref, the transistor 41 is turned on to allow current flow across resistors R1 and R2 hence reducing the contrast control voltage 7. The circuit of FIG. 4 may be substituted by any other appropriate arrangement.

The amplitude of the video signal passing through the distributing circuit 2 shown in FIG. 1 is relatively small. The video signal of such a small amplitude with a wide frequency bandwidth can be handled by common transistors of a given voltage rating and a given slew rate which are commercially available at lower cost.

As described above, the first embodiment of the present invention allows a smaller amplitude of the signal to be processed as compared with the conventional method in which the beam current detecting circuit is connected at the CRT cathode. Accordingly, the beam currents of their respective R, G, and B colors for the CRT 5 can be limited separately without disturbing the optimization of driving signal of a high amplitude and a wide frequency range.

Also, the contrast control can maintain the linearity of the video signals.

Second Exemplary Embodiment

A second embodiment of an automatic beam current limiting apparatus of the present invention will be described referring to FIG. 2.

Figure 2:
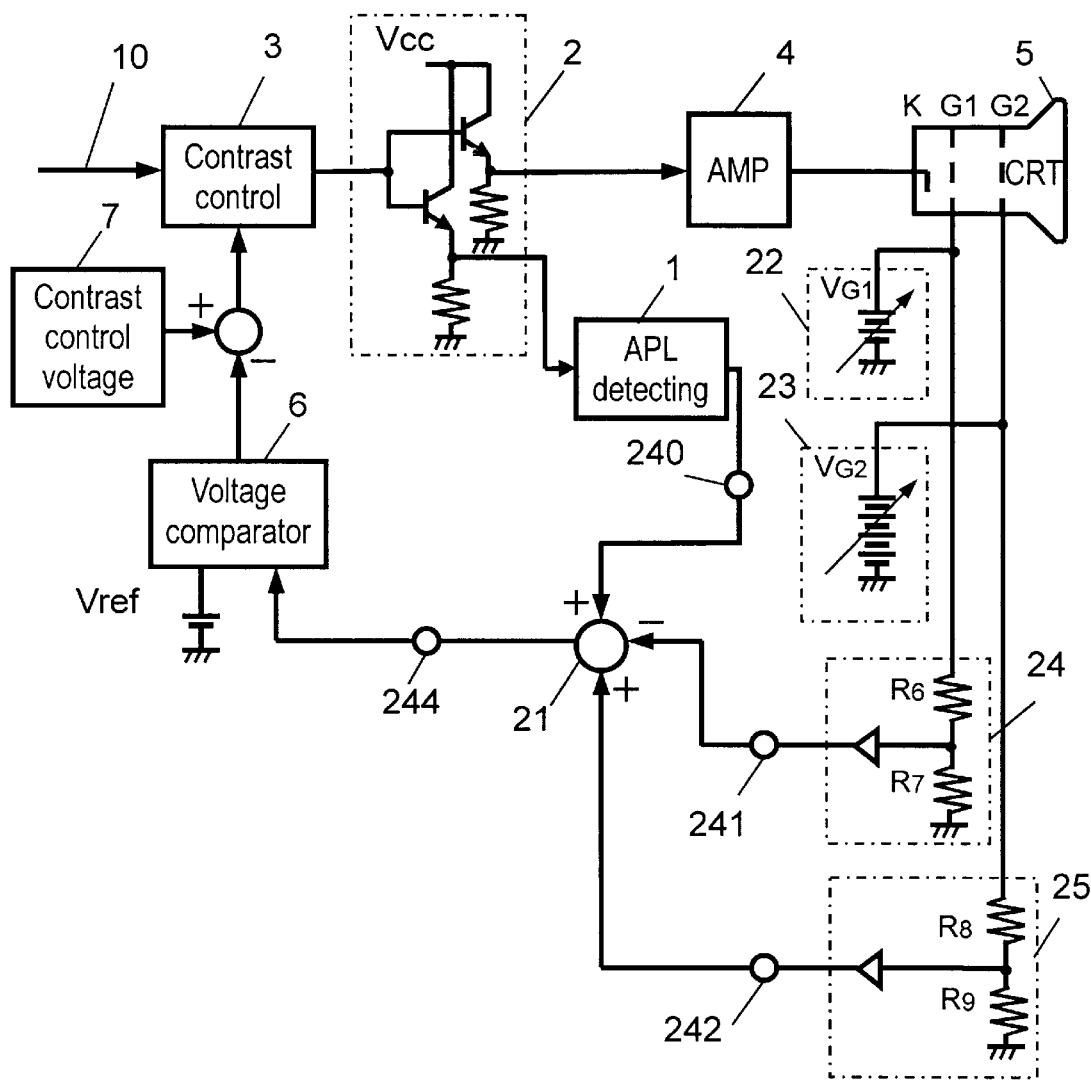
FIG. 2 is a block diagram of an automatic beam current limiting apparatus showing a second embodiment of the present invention.

As shown in FIG. 2, the arrangement of a video input signal 10, an APL detecting circuit 1, a signal distributing circuit 2, a contrast control circuit 3, a video power amplifier 4, a voltage comparator circuit 6, and a contrast control voltage 7 is identical to that of FIG. 1 and explaination of these elements is omitted.

The circuit of FIG. 2 includes the following components in addition to the first embodiment shown in FIG. 1. Those are G1 voltage generating circuits 22r, 22g, 22b for generating G1 voltages VG1r, VG1g, VG1b respectively supplied to the first grid G1 of a CRT 5, G1 voltage detecting circuits 24r, 24g, 24b for detecting the G1 voltages VG1r, VG1g, VG1b respectively, G2 voltage generating circuits 23r, 23g, 23b for generating G2 voltages VG2r, VG2g, VG2b respectively supplied to the second grid G2 of the CRT 5, G2 voltage detecting circuits 25r, 25g, 25b for detecting the G2 voltages VG2r, VG2g, VG2b respectively, and calculating circuits 21r, 21g, 21b for calculating the APL, VG1, and VG2 voltages of their respective colors.

Although three sets of the G1 voltage generating circuits 22r, 22g, 22b, the G1 voltage detecting circuits 24r, 24g, 24b, the G2 voltage generating circuits 23r, 23g, 23b, the G2 voltage detecting circuits 25r, 25g, 25b, and the calculating circuits 21r, 21g, 21b are needed in practice as well as the APL detecting circuit 1, the signal distributing circuit 2, the contrast control circuit 3, the video power amplifier 4, and the voltage comparator circuit 6 for three different color R, G, and B signals, they are identical in the arrangement and action and one set will be explained disregarding the suffixes r, g, and b as shown in FIG. 2.

The video input signal 10 shown in FIG. 2 is a color video signal and if the signal is a monochrome video signal, only one set of arrangement can be provided.

The following description will hence is made in relation to one set of the arrangement unless otherwise specified.

The principle of the circuitry of FIG. 2 is explained below. The beam current for the CRT 5 is determined by the G1 voltage VG1 and the G2 voltage VG2 (where a G1 potential VG1 is negative and a G2 potential VG2 is positive to the cathode potential).

For loading the cathode K of the CRT 5 with a video signal, the G1 and G2 voltage VG1, VG2 are selected so that the CRT is cut off at the pedestal level of the video signal. The voltage between grid G1 and the cathode K of which CRT is cut off is called a cut-off voltage which is governed by the G2 voltage.

In common, the beam current is increased when the voltage between the grid G1 and the cathode K drops. The beam current is also increased as the G2 voltage rises.

It is necessary to determine two voltages VG1 and VG2 applied to the G1 and G2 electrode respectively so that the pedestal level (black level) of the video power signal voltage of the video power amplifier 4 is equal to the cut-off voltage for the CRT 5.

With the voltages VG1 and VG2 having thus been determined, the video power signal voltage can be attenuated and controlled when the APL is higher than a predetermined level, thus preventing any unwanted fault or failure.

This embodiment is provided for remedying the case where the voltages VG1 and VG2 are diverted from their settings or predetermined values.

Figure 5:
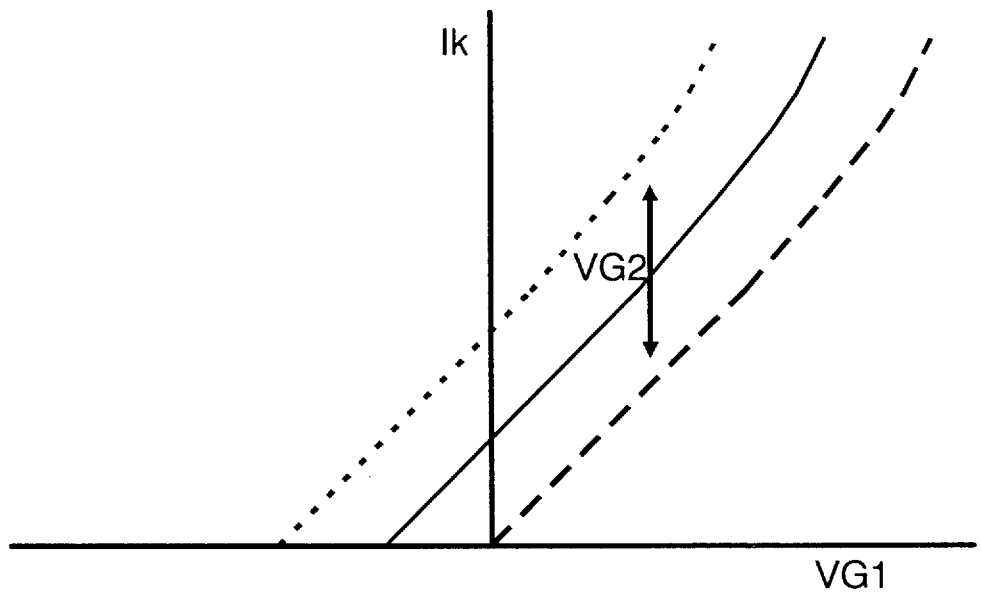
FIG. 5 is a diagram showing the relation between grid voltage and beam current.

FIG. 5 illustrates the relation among G1 voltage VG1 and G2 voltage VG1 and the beam current IK with the anode voltage and cathode voltages being constant. From the relation, a calculating circuit 21 of the embodiment subtracts from a detected APL voltage 240 a G1 detecting voltage 241, which is divided from the G1 voltage, and adds a G2 detecting voltage 242, which is divided from the G2 voltage. A resultant output of the calculating circuit 21 is fed to the voltage comparator circuit 6. When the output voltage 244 of the calculating circuit 21 is higher than the threshold voltage Vref, the voltage comparator circuit 6 limits the beam current by limiting the gain of the contrast control circuit 3.

Figure 6A:
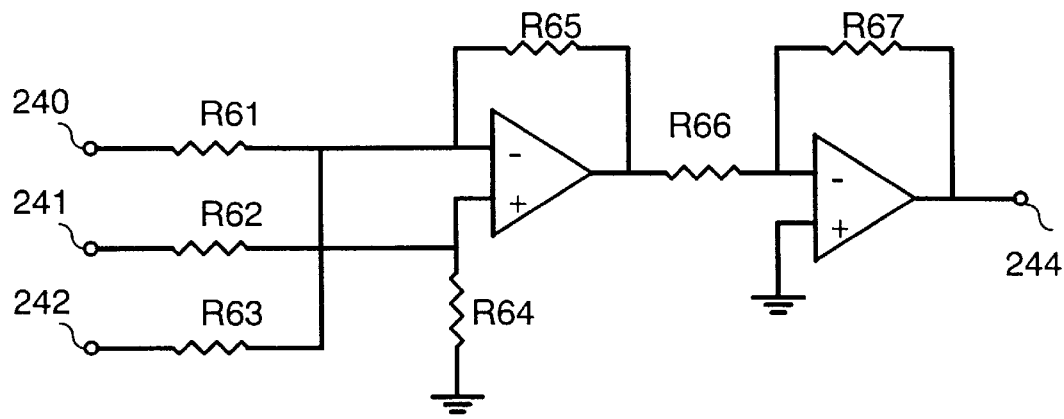
FIG. 6A is a block diagram embodying the calculating circuit of the second embodiment with an analog processing circuit.
Figure 6B:
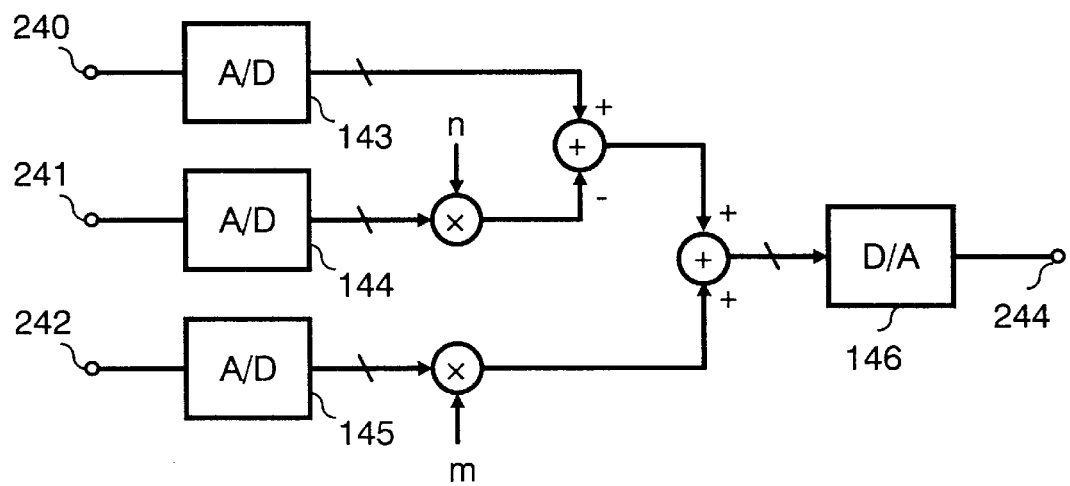
FIG. 6B is a block diagram embodying the calculating circuit of the second embodiment with a digital processing circuit.
Figure 7:
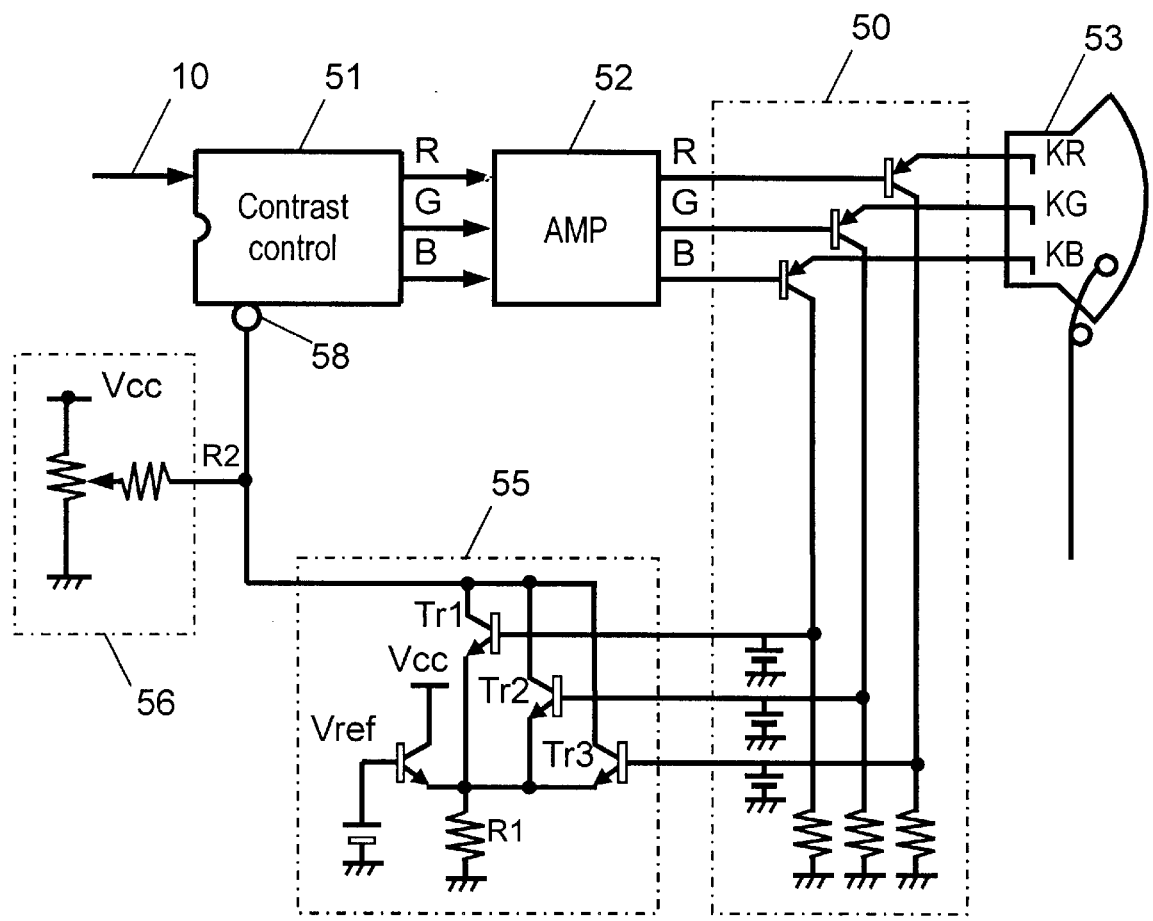
FIG. 7 is a block diagram of a conventional automatic beam current controlling apparatus.
Figure 8A:
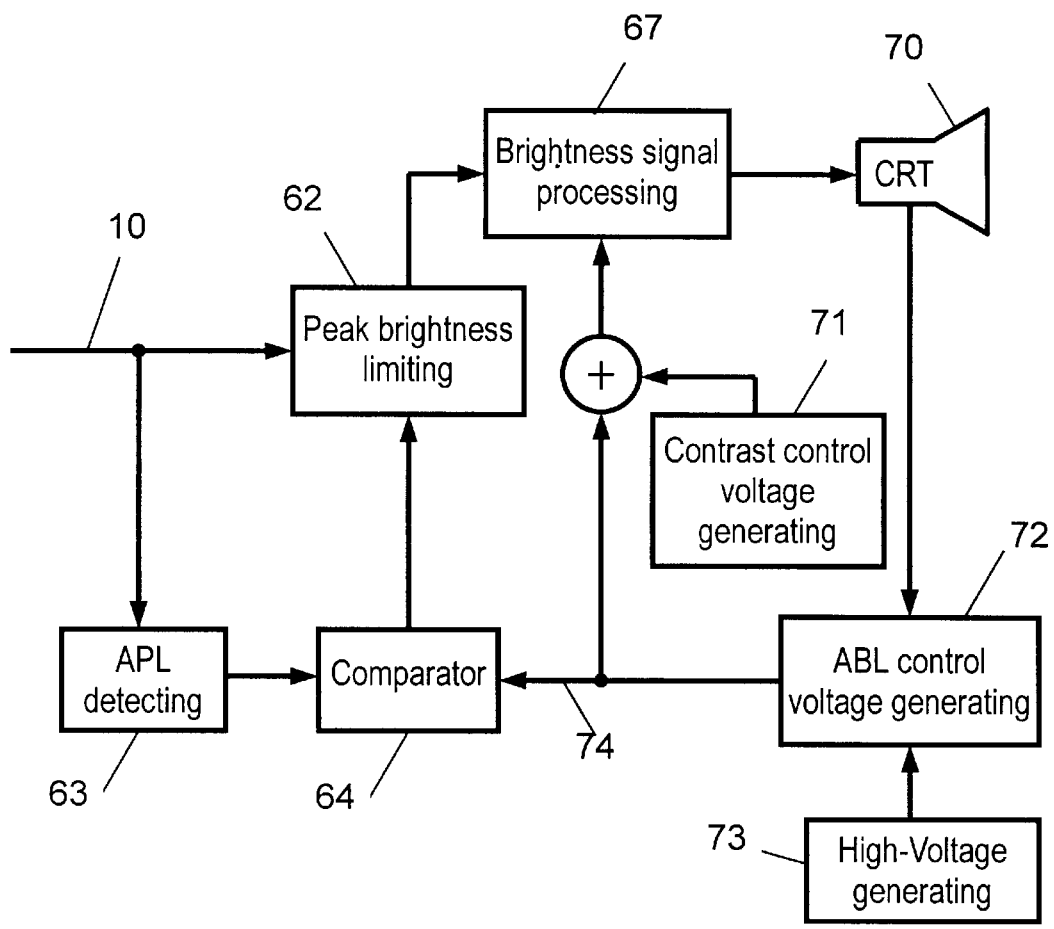
FIG. 8A is a block diagram of another conventional automatic beam current controlling apparatus.
Figure 8B:
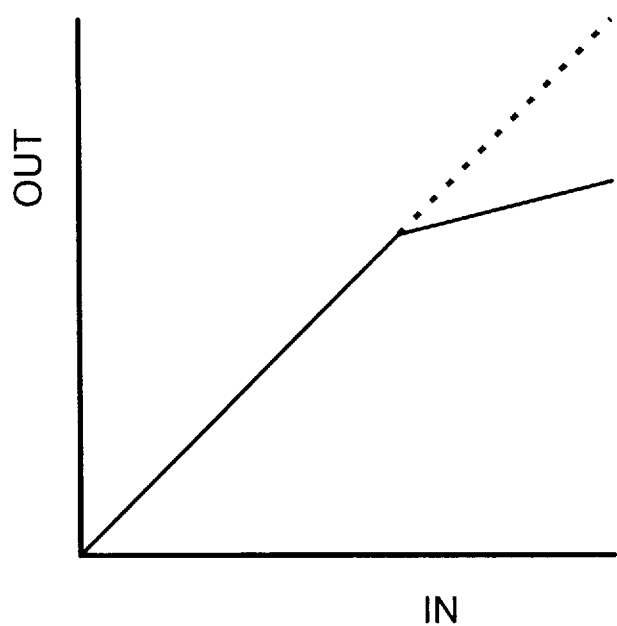
FIG. 8B is a diagram showing the relation between an input video signal and an output video signal in the automatic beam current controlling circuit shown in FIG. 8A.

The calculating circuit 21 may be implemented practically by an analog calculating circuit shown in FIG. 6A or a digital signal processing circuit shown in FIG. 6B.

Referring to FIG. 6A, it is assumed that the APL voltage 240 is VAPL, the G1 detecting voltage 241 is VG1, the G2 detecting voltage is VG2, and the resistance's are R61, R62, R63, R64, R65, R66, and R67.

If R61=R64=R65=R66=R67=R,

R62=(a−1)R,

R63=bR, and b>>1, then the resultant output 244 denoted at V0 is expressed by:

V0≅VAPL−2VG1/a+VG2/b

In FIG. 6B, the resultant output 244 is calculated from:

V0=VAPL−nVG1+mVG2

The voltage dividing parameter a and b or n and m, for determining the G1 and G2 detecting voltages, are varied depending on a type of CRT used.

When the voltages VG1 and VG2 of the first grid G1 and second grid G2 of the CRT respectively have been determined according to the embodiment, the linearity in the amplifying circuit can be maintained without disturbing the increase of a frequency range.

More specifically, the second embodiment allows the threshold used for limiting the beam current to be controlled in response to variations of VG1 and VG2 in addition to the effect of the first embodiment.

Third Exemplary Embodiment

A third embodiment of an automatic beam current limiting apparatus of the present invention will be described referring to FIG. 3.

One of the CRT driving methods for increasing the amplitude and the frequency bandwidth of a video output is featured where video signals to the cathode K and the grid G1 of a CRT are opposite one another in polarity. This is also known as a twin-drive method. As shown in FIG. 3, the automatic beam current limiting apparatus of the third embodiment employs the twin-drive method for driving the CRT.

Figure 3:
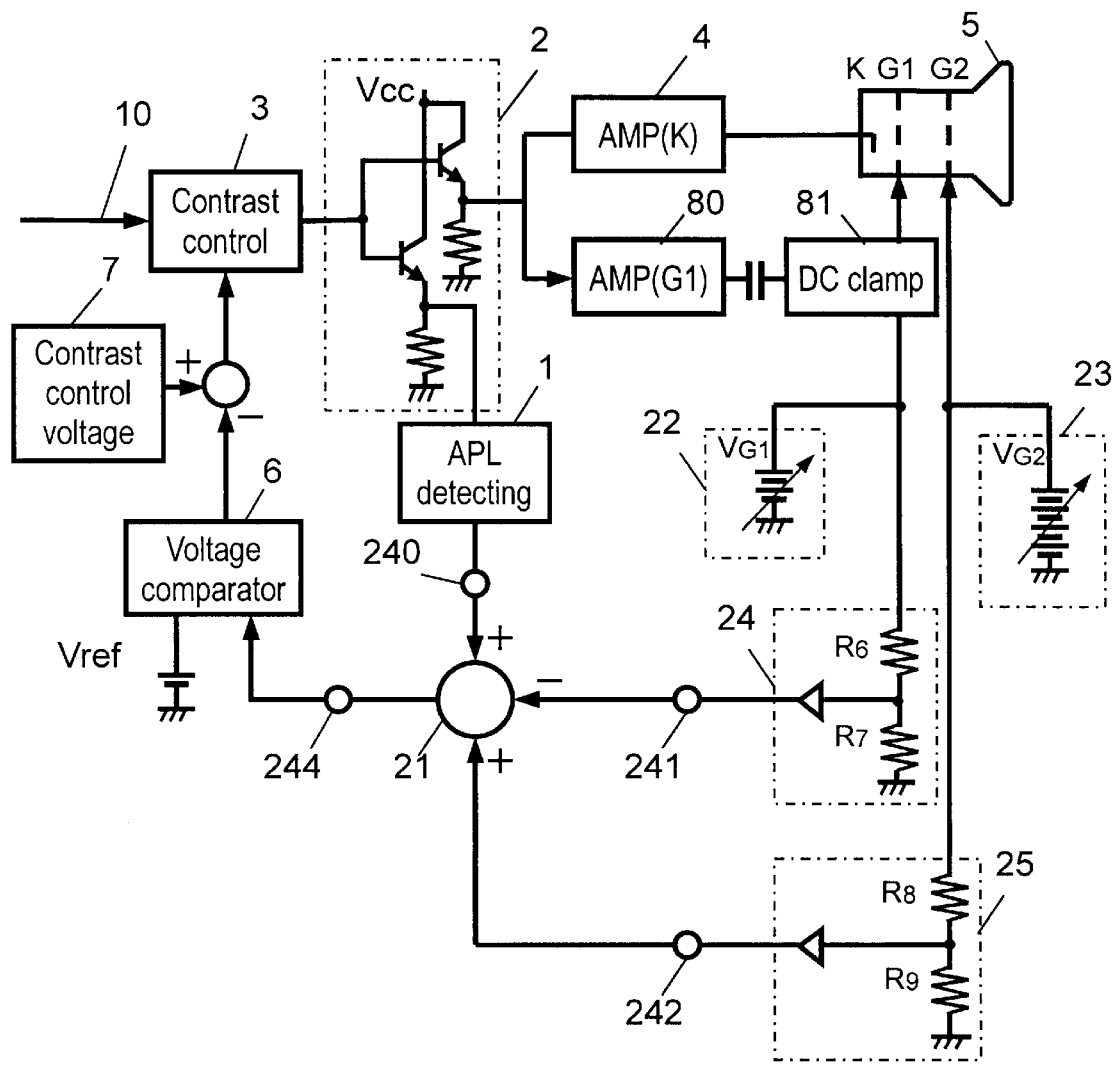
FIG. 3 is a block diagram of an automatic beam current limiting apparatus showing a third embodiment of the present invention.

The circuitry arrangement of FIG. 3 is similar to that of FIG. 2 except that a video power amplifier AMP(G1) 80 and a DC clamp circuit 81 are added and the same components are denoted by the same numerals as in FIG. 2.

The output of the video power amplifier AMP(G1) 80 is clamped at the VG1 voltage level by the DC clamp circuit 81. The G1 clamp voltage VG1 is divided and transmitted to the calculating circuit 21.

The video power amplifier AMP(G1) 80 has identical characteristics to those of video power amplifier AMP(K) 4 except that the polarity of its video power voltage output is inverted.

Accordingly, the third embodiment allows the video output to be increased in amplitude and frequency range in addition to the effect of the second embodiment.

As set forth above, the first embodiment of the present invention is capable of processing a signal of a small amplitude as compared with the conventional method in which the beam current detecting circuit is disposed ahead of a CRT cathode. This allows the beam currents of R, G, and B colors for the CRT to be limited separately without disturbing the increase of an amplitude and a frequency range of a video output. In addition, the linearity of the video signal can be maintained.

The second embodiment of the present invention is also capable of handling a small amplitude signal thus allowing the beam currents of R, G, and B colors for CRT to be limited separately without disturbing the increase of an amplitude and a frequency range of a video output. Also, the linearity of the video signal can be maintained and a threshold used for limiting the beam signal can be controlled corresponding to variations of VG1 and VG2.

Similarly, the third embodiment of the present invention is capable of handling a small amplitude signal thus allowing the beam currents of R, G, and B colors for CRT to be limited separately without disturbing the increase of an amplitude and a frequency range of a video output. Also, the linearity of the video signal can be maintained and a threshold used for limiting the beam signal can be controlled corresponding to variations of VG1 and VG2. Furthermore, the CRT driving is carried out by a twin-drive technique which will thus ensure the increase of an amplitude and a frequency range of a video output with much ease.

It would be understood that the automatic beam current limiting apparatus of the present invention may be implemented by any other appropriate circuitry arrangement than the above described circuitry arrangement including the voltage comparator circuit and contrast control voltage circuit, the analog calculating circuit, or the digital calculating circuit as shown in their respective block diagrams. Also, various changes and modifications of the above embodiments will be possible. More particularly, modifications which fall in the spirit and scope of the present invention should be covered by the claims of the present invention.

What is claimed is:

1. An automatic beam current limiting apparatus for use with a CRT display and a video signal comprising:

signal distributing means for distributing the video signal;

detecting means for detecting the average video amplitude level of the video signal distributed from the signal distributing means;

calculating means for calculating the average video amplitude level of the video signal detected by the detecting means with a first grid voltage and a second grid voltage in the CRT to which the video signal is applied;

comparing means for comparing an output of the calculating means with a reference voltage; and contrast control means for controlling the amplitude of the video signal when the average video amplitude level of the video signal is higher than the reference voltage.

2. An automatic beam current limiting apparatus according to claim 1, wherein the first grid voltage is clamped by a DC voltage derived from the video signal.

3. An automatic beam current limiting apparatus according to claim 1, wherein the video signal is a color video signal having a plurality of colors.

4. An automatic beam current limiting apparatus according to claim 3, wherein the detecting means detects a respective plurality of average video amplitude levels for each of said plurality of colors of the color video signal, the comparing means compares each of the plurality of average video levels with a respective plurality of reference voltages, and the contrast control means controls the amplitude of at least a respective one of the plurality of colors of the video signal based on a comparison from the comparing means.

5. An automatic beam current limiting apparatus according to claim 1, wherein the video signal is a color video signal having a plurality of colors.

6. A method of automatically limiting beam currents in a CRT display for use with a video signal comprising the steps of:

distributing the video signal;

detecting the average video amplitude level of the distributed video signal;

calculating the average video amplitude level of the detected video signal with i) a first grid voltage in the CRT and ii) a second grid voltage in the CRT to which the video signal is applied;

comparing a resultant output of the calculating means with a reference voltage; and controlling the amplitude of the video signal when the average video amplitude level of the video signal is higher than the reference voltage.

7. A method of automatically limiting beam currents according to claim 6, further comprising the step of clamping the first grid voltage with a DC voltage derived from the video signal.

8. A method of automatically limiting beam currents according to claim 6, wherein the video signal is a color video signal having a plurality of colors.

9. An automatic beam current limiting apparatus according to claim 6, wherein the video signal is a color video signal having a plurality of colors.

* * * * *